US009745643B2

(12) United States Patent
Oguma et al.

(10) Patent No.: US 9,745,643 B2
(45) Date of Patent: Aug. 29, 2017

(54) METHOD FOR TREATING COMBUSTIBLE MATERIAL AND INSTALLATION

(71) Applicant: MITSUBISHI MATERIALS CORPORATION, Tokyo (JP)

(72) Inventors: Nobuhiro Oguma, Tokyo (JP); Shigeru Ishikawa, Kagawa-gun (JP); Makoto Takagi, Kagawa-gun (JP); Yuji Mizuta, Kagawa-gun (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 218 days.

(21) Appl. No.: 14/414,789

(22) PCT Filed: Oct. 10, 2013

(86) PCT No.: PCT/JP2013/077677
§ 371 (c)(1),
(2) Date: Jan. 14, 2015

(87) PCT Pub. No.: WO2014/203413
PCT Pub. Date: Dec. 24, 2014

(65) Prior Publication Data
US 2015/0176102 A1    Jun. 25, 2015

(30) Foreign Application Priority Data

Jun. 21, 2013  (JP) .................. 2013-130944

(51) Int. Cl.
*C22B 15/00* (2006.01)
*C22B 5/02* (2006.01)
(Continued)

(52) U.S. Cl.
CPC ........ *C22B 15/0056* (2013.01); *B09B 3/0083* (2013.01); *C22B 5/02* (2013.01);
(Continued)

(58) Field of Classification Search
CPC ....... C22B 5/02; C22B 7/001; C22B 15/0036; C22B 15/005; C22B 15/0052; F27D 3/18; F27B 19/04
See application file for complete search history.

(56) References Cited

U.S. PATENT DOCUMENTS 3,130,252 A * 4/1964 Metz ............... C21C 5/4606
239/132.3
3,664,828 A * 5/1972 Worner ............ C22B 15/0036
75/645
(Continued)

FOREIGN PATENT DOCUMENTS

JP    49-3812 A     1/1974
JP    59-113132 A   6/1984
(Continued)

OTHER PUBLICATIONS

Derwent Acc 1987-360247 for the patent family including JP 62-263934 A (Nov. 1987) and JP 95-021391 B2 (Mar. 1995) by Moriyama. Abstract.*
(Continued)

*Primary Examiner* — George Wyszomierski
*Assistant Examiner* — Tima M McGuthry Banks
(74) *Attorney, Agent, or Firm* — Locke Lord LLP (57) ABSTRACT

A method for treating combustible material of the present invention includes providing a pipe opened to a molten substance surface above the molten substance surface of molten substance stored in a furnace body for smelting nonferrous metals, and blowing combustible material containing valuable metals and oxygen-enriched air into the molten substance surface of the molten substance from the pipe.

20 Claims, 5 Drawing Sheets

(51) Int. Cl.
*C22B 7/00* (2006.01)
*F27B 19/04* (2006.01)
*F27D 3/18* (2006.01)
*C22B 15/04* (2006.01)
*B09B 3/00* (2006.01)
*F27D 3/16* (2006.01)

(52) U.S. Cl.
CPC .............. *C22B 7/001* (2013.01); *C22B 15/00* (2013.01); *C22B 15/005* (2013.01); *C22B 15/0036* (2013.01); *C22B 15/0052* (2013.01); *F27B 19/04* (2013.01); *F27D 3/16* (2013.01); *F27D 3/18* (2013.01); *F27D 2003/168* (2013.01); *F27D 2003/185* (2013.01)

(56) References Cited

U.S. PATENT DOCUMENTS

| | | | |
|---|---|---|---|
| 3,890,139 | A | 6/1975 | Suzuki et al. |
| 4,127,408 | A * | 11/1978 | Weigel ................. C22B 15/006 75/649 |
| 4,475,947 | A * | 10/1984 | Andersson ................ C22B 5/02 266/155 |
| 4,798,532 | A * | 1/1989 | Kimura ..................... C22B 5/14 110/238 |
| 5,180,422 | A * | 1/1993 | Kikumoto ............. C22B 15/005 75/641 |
| 5,662,730 | A * | 9/1997 | Akagi ................. C22B 15/0047 75/639 |
| 6,210,463 | B1 * | 4/2001 | George ................. C22B 15/003 266/160 |
| 2002/0053306 | A1 * | 5/2002 | Nishiwaki ........... C22B 15/0056 110/249 |

FOREIGN PATENT DOCUMENTS

| | | | |
|---|---|---|---|
| JP | 62-096624 | A | 5/1987 |
| JP | 62-263934 | A * | 11/1987 |
| JP | 01-246327 | A | 10/1989 |
| JP | 04-183828 | A | 6/1992 |
| JP | 07-113516 | A | 12/1995 |
| JP | 07-113516 | B | 12/1995 |
| JP | 09-078151 | A | 3/1997 |
| JP | 2855870 | B2 | 2/1999 |
| JP | 2002-062059 | A | 2/2002 |
| JP | 2006-022387 | A | 1/2006 |
| JP | 2009-287863 | A | 12/2009 |

OTHER PUBLICATIONS

Machine translation of JP 95-021391 B2 published Mar. 1995.*
Office Action mailed Feb. 17, 2015, issued for the Japanese patent application No. 2013-130944 and English translation thereof.
International Search Report mailed Dec. 24, 2013, issued for PCT/JP2013/077677 and English translation thereof.
Office Action mailed Dec. 2, 2014, issued for the Japanese patent application No. 2013-130944 and English translation thereof.

* cited by examiner

METHOD FOR TREATING COMBUSTIBLE MATERIAL AND INSTALLATION

TECHNICAL FIELD

The present invention relates to a method for treating combustible material by charging and melting combustible material (combustible scrap) containing valuable metals (such as Cu, Au, Ag, Pt, and Pd), such as waste electronic components or waste electronic substrates, into molten substance stored in a furnace body in a smelting furnace such as a continuous copper-smelting installation, a smelting furnace, and a continuous copper-smelting installation used for the implementation thereof.

Priority is claimed on Japanese Patent Application No. 2013-130944, filed Jun. 21, 2013, the content of which is incorporated herein by reference.

BACKGROUND ART

In waste such as waste electronic components or waste electronic substrates (combustible scrap, referred to as combustible materials below), valuable metals such as copper (Cu), gold (Au), silver (Ag), platinum (Pt), and palladium (Pd) are contained together with combustible plastics.

While such combustible materials are used for heating molten substance by charging (feeding) the combustible materials into a smelting furnace such as a continuous copper-smelting installation and burning and melting (the term of "burning and melting" used in the specification refers to "burning and/or melting") the combustible materials, the valuable metals are recovered with copper in the post-process.

In the related art, for example, as disclosed in PTLs 1 and 2 below, combustible material containing valuable metals is allowed to fall onto a molten substance surface of molten substance from a charging port provided on a ceiling wall or a side wall of a furnace body. In addition, in PTLs 1 and 2, the combustible material is press-formed into a lump and charged into the molten substance and thus a waste heat boiler or the like is prevented from being damaged. That is, for example, when the combustible material is allowed to fall into the molten substance in a state in which the combustible material is finely crushed into powder or particles instead of press-forming the combustible material into a lump, the combustible material is easily discharged together with a flue gas from a gas zone (a space above the molten substance surface) of the furnace body and burned in the waste heat boiler. Thus, there is a concern of damaging the waste heat boiler or the like.

In addition, a lance pipe which is opened to the molten substance surface is provided above the molten substance surface of the molten substance in the furnace body. Mineral ores (concentrates) containing nonferrous metals such as copper ores and oxygen-enriched air (air having an oxygen content of about 40% to 70%) are blown onto the molten substance surface of the molten substance from the lance pipe. Further, in order to maintain the temperature of the molten substance within a predetermined high temperature range, coke or powdered coal (hereinafter, collectively referred to as "coal") is charged as a fuel for heat compensation.

CITATION LIST

Patent Literature

[PTL 1] Japanese Examined Patent Application, Second Publication No. H7-113516
[PTL 2] Japanese Patent No. 2855870

SUMMARY OF INVENTION

Technical Problem

However, the method for treating combustible material, the smelting furnace, and the continuous copper-smelting installation in the related art have the following problems.

Since the combustible material falling onto the molten substance surface of the molten substance in the furnace body easily remains on the molten substance surface as it is and is burned and melted while floating on the molten substance, a large contact region between the combustible material and the molten substance is not able to be ensured. Accordingly, a long time is required for treatment and the treatment capacity is limited.

In addition, the heat of the combustible material (combustion heat) burning on the molten substance surface escapes into the gas zone above the molten substance surface and is not sufficiently used for heating the molten substance. Due to the combustion heat, there is a concern that bricks provided on the inner wall of the gas zone of the furnace body may be exposed to a high temperature and be worn (damaged, deteriorated, or naturally decreased) or a waste heat boiler which receives a flue gas from the gas zone may be overheated.

Further, since the molten substance and the combustible material are not sufficiently stirred, the combustible material remains unmelted in the molten substance and is discharged with slag outside the system while containing the valuable metal components to cause slag loss of valuable metals. Particularly, in the related art, since the combustible material is press-formed into a lump, the combustible material easily remains unmelted.

In addition, for example, in the continuous copper-smelting installation, when the molten substance (matte and slag) flows in a launder which connects the smelting furnace and a separating furnace on the downstream side thereof, there is a concern that the launder may be blocked by the combustible material remaining unmelted and the molten substance may overflow from the launder.

Further, it is required that the running cost be reduced by reducing the amount of coal charged into the molten substance as a fuel for heat compensation in this type of smelting furnace.

The present invention is made in consideration of the above circumstances and an object thereof is to provide a method for treating combustible material capable of effectively using the combustion heat of the combustible material for heating molten substance by bringing the combustible material into sufficient contact with the molten substance, increasing a treatment capacity of the combustible material by reducing the combustible material remaining unmelted and suppressing the slag loss of valuable metals, reducing the running cost, and preventing an inner wall of a gas zone of a furnace body and a waste heat boiler from being damaged, a smelting furnace, and a continuous copper-smelting installation used for the implementation thereof.

Solution to Problem

According to an aspect of the present invention, a method for treating combustible material is provided, including providing a pipe which is opened to a molten substance surface above the molten substance surface of molten substance stored in a furnace body which smelts nonferrous metals, and blowing combustible material containing valuable metals and oxygen-enriched air into the molten substance surface of the molten substance from the pipe.

According to another aspect of the present invention, a smelting furnace used for implementation of the above-described method for treating combustible material is provided, in which a pipe which is opened to the molten substance surface is provided above the molten substance surface of the molten substance stored in the furnace body, and combustible material containing valuable metals and oxygen-enriched air can be blown into the molten substance surface of the molten substance through the pipe.

According to the present invention, since the combustible material and the oxygen-enriched air (for example, air having an oxygen content of about 40% to 70%) are blown onto the molten substance surface of the molten substance stored in the furnace body from the pipe above the molten substance surface, the combustible material easily deeply enters the molten substance and thus a large contact region with the molten substance is ensured. Accordingly, the combustible material is quickly heated, burned and melted, and does not easily remain unmelted. Therefore, the treatment efficiency of the combustible material is improved and the treatment capacity can be increased.

Further, since the combustible material is blown into the molten substance with the oxygen-enriched air, combustible components contained in the combustible material easily react with oxygen in the molten substance and thus the combustible material is more easily burned and melted. Furthermore, when the combustible material and the oxygen-enriched air are blown into the molten substance, an effect to stir the combustible material in the molten substance is also obtained and the above-described effects can be more remarkably obtained.

According to the present invention, since the combustible material remaining unmelted is prevented from being discharged with slag outside of the system while containing valuable metal components unlike the related art, the slag loss of the valuable metals are reduced.

Here, for example, a launder which connects the smelting furnace and a separating furnace on the downstream side thereof is provided in a continuous copper-smelting installation and the molten substance (matte and slag) discharged (overflowing) from the furnace body of the smelting furnace flows into the separating furnace through the launder. According to the present invention, since the combustible material remaining unmelted is prevented from flowing in the launder with the molten substance, the launder is prevented from being blocked and also the molten substance is prevented from overflowing from the launder.

In addition, since the combustible material is blown into the molten substance and burned, the combustion heat of the combustible material is effectively used for heating the molten substance. Thus, the amount of coal (fossil fuels such as coke or powdered coal) charged into the molten substance as a fuel for heat compensation can be reduced and the running cost can be reduced.

According to the present invention, the combustible material is prevented from remaining and burning on the molten substance surface of the molten substance. Accordingly, for example, a defect that bricks provided on the inner wall of the gas zone of the furnace body are worn or a waste heat boiler is overheated due to the combustion heat of the combustible material burning on the molten substance surface as in the related art is prevented.

Further, since the combustible material and the oxygen-enriched air are blown from the pipe which is opened to the molten substance surface of the molten substance, the combustible material does not easily float in the gas zone of the furnace body. Thus, for example, a material that is finely crushed into powder or particles can be used as the combustible material. That is, in the related art, when combustible material in the form of powder or particles is allowed to simply fall onto the molten substance surface of the molten substance, the combustible material is easily discharged with a flue gas and there is a concern of damaging a waste heat boiler. In contrast, in the present invention, even when combustible material in the form of powder or particles is used, the combustible material is blown onto the molten substance surface of the molten substance and thus easily enters the molten substance, and the above-described defect is prevented.

In addition, in the present invention, when a material in the form of powder or particles is used as the combustible material, the combustible material is more quickly burned and melted in the molten substance and further does not easily remain unmelted and the above-described effects are particularly remarkably obtained.

From the above description, according to the present invention, the combustible material can be brought into sufficient contact with the molten substance and the combustion heat of the combustible material can be effectively used for heating the molten substance. The slag loss of the valuable metals is suppressed by reducing the combustible material remaining unmelted and thus the treatment capacity of the combustible material can be increased. The running cost can be reduced and the inner wall of the gas zone of the furnace body or the waste heat boiler can be prevented from being damaged.

In the method for treating combustible material according to another aspect of the present invention, a lance pipe for blowing mineral ores containing nonferrous metals and oxygen-enriched air into the molten substance surface of the molten substance may be used as the pipe.

In the smelting furnace according to another aspect of the present invention, the pipe may be a lance pipe capable of blowing mineral ores containing nonferrous metals and oxygen-enriched air into the molten substance surface of the molten substance.

In this case, the present invention can be implemented by using an existing lance pipe for charging mineral ores (concentrates) into molten substance provided in a smelting furnace of the related art. Accordingly, the furnace body can have a simple structure (that is, the structure can be maintained without being complicated) and thus the installation cost is reduced.

The method for treating combustible material according to another aspect of the present invention, using a continuous copper-smelting installation including a smelting furnace, a separating furnace, and a copper-producing furnace, which are connected to one another with launders, may further include heating and melting copper ores to produce molten substance including matte and slag in the smelting furnace, separating the matte and the slag produced in the smelting furnace from each other in the separating furnace, oxidizing the matte separated in the separating furnace to produce blister copper and slag in the copper-producing furnace, and blowing the combustible material and the oxygen-enriched air into the molten substance surface of the molten substance from the pipe in the smelting furnace.

According to still another aspect of the present invention, a continuous copper-smelting installation is provided, including a smelting furnace for heating and melting copper ores to produce molten substance including matte and slag, a separating furnace for separating the matte and the slag produced in the smelting furnace from each other, a copper-producing furnace for oxidizing the matte separated in the separating furnace to produce blister copper and slag, and launders for connecting the smelting furnace, the separating furnace, and the copper-producing furnace, in which the above-described smelting furnace is used as the smelting furnace.

In this case, the present invention can be applied to, for example, a continuous copper-smelting installation including an S furnace (smelting furnace), a CL furnace (separating furnace), and a C furnace (copper-producing furnace), represented as a Mitsubishi continuous copper-smelting process (Mitsubishi MI process), and the S furnace and also the above-described effects can be obtained.

In the method for treating combustible material according to another aspect of the present invention, the amount of coal charged into the molten substance may be adjusted according to heat quantity contributed to the molten substance from the combustible material charged into the molten substance.

In this case, for example, when the heat quantity contributed to the molten substance from the combustible material charged into the molten substance is increased (or was increased), the amount of coal charged into the molten substance is decreased according to the increase. When the heat quantity contributed to the molten substance from the combustible material is decreased (or was decreased), the amount of coal charged into the molten substance is increased according to the decrease. Accordingly, the temperature of the molten substance can be stably maintained.

In the present invention, as described above, a sufficient heat quantity contributed to the molten substance from the combustible material is easily ensured, and the amount of coal used is reliably decreased, and thus, the running cost can be reduced. Also, the temperature of the molten substance is stably maintained within a predetermined range and thus the treatment in the molten substance is stable.

Specifically, in the method of the related art, the combustible material is only allowed to fall on the molten substance surface of the molten substance. Therefore, the combustible material is not effectively used for heating the molten substance such that the temperature of the molten substance can be stably maintained or increased. Accordingly, even when the amount of the charged combustible material is simply increased, it is not easy to increase the heat quantity contributed to the molten substance from the combustible material and it is difficult to decrease the amount of the charged coal. Further, in the method of the related art, when the amount of the combustible material charged into the molten substance is simply increased, there is a concern that the inner wall of the gas zone of the above-described furnace body or a waste heat boiler may be damaged.

In the method for treating combustible material according to another aspect of the present invention, the furnace body may be used in copper smelting and the molten substance may be treated in a post-process to recover the valuable metals in a state in which the valuable metals are contained in blister copper.

In this case, for example, the furnace body is used in the smelting furnace in the continuous copper-smelting installation, and the valuable metals in the combustible material can be effectively recovered with blister copper in the copper-producing furnace or the like in the post-process of the smelting furnace.

In the smelting furnace according to another aspect, a mixing region in which the combustible material and the oxygen-enriched air are mixed may be provided in the pipe.

In this case, the combustible material and the oxygen-enriched air blown into the molten substance surface of the molten substance through the pipe are ejected in a state in which the combustible material and the oxygen-enriched air are mixed in the pipe. Accordingly, the combustible material blown into the molten substance is more easily burned and melted and the above-described effects are more remarkably obtained.

Advantageous Effects of Invention

According to the present invention, the combustible material can be brought into sufficient contact with the molten substance and the combustion heat of the combustible material can be effectively used for heating the molten substance. The combustible material remaining unmelted is reduced and the slag loss of the valuable metals is suppressed so that the treatment capacity of the combustible material can be increased. The running cost can be reduced and the inner wall of the gas zone of the furnace body and the waste heat boiler can be prevented from being damaged.

DESCRIPTION OF EMBODIMENTS

Hereinafter, a smelting furnace 10 employing a method for treating combustible material according to an embodiment of the present invention and a continuous copper-smelting installation 1 including the smelting furnace 10 will be described with reference to the drawings.

The smelting furnace 10 according to the embodiment is used as an S furnace in the continuous copper-smelting installation 1 including an S furnace (smelting furnace), a CL furnace (separating furnace), a C furnace (copper-producing furnace), and a refining furnace, represented as a Mitsubishi continuous copper-smelting process (Mitsubishi MI process).

Figure 1:
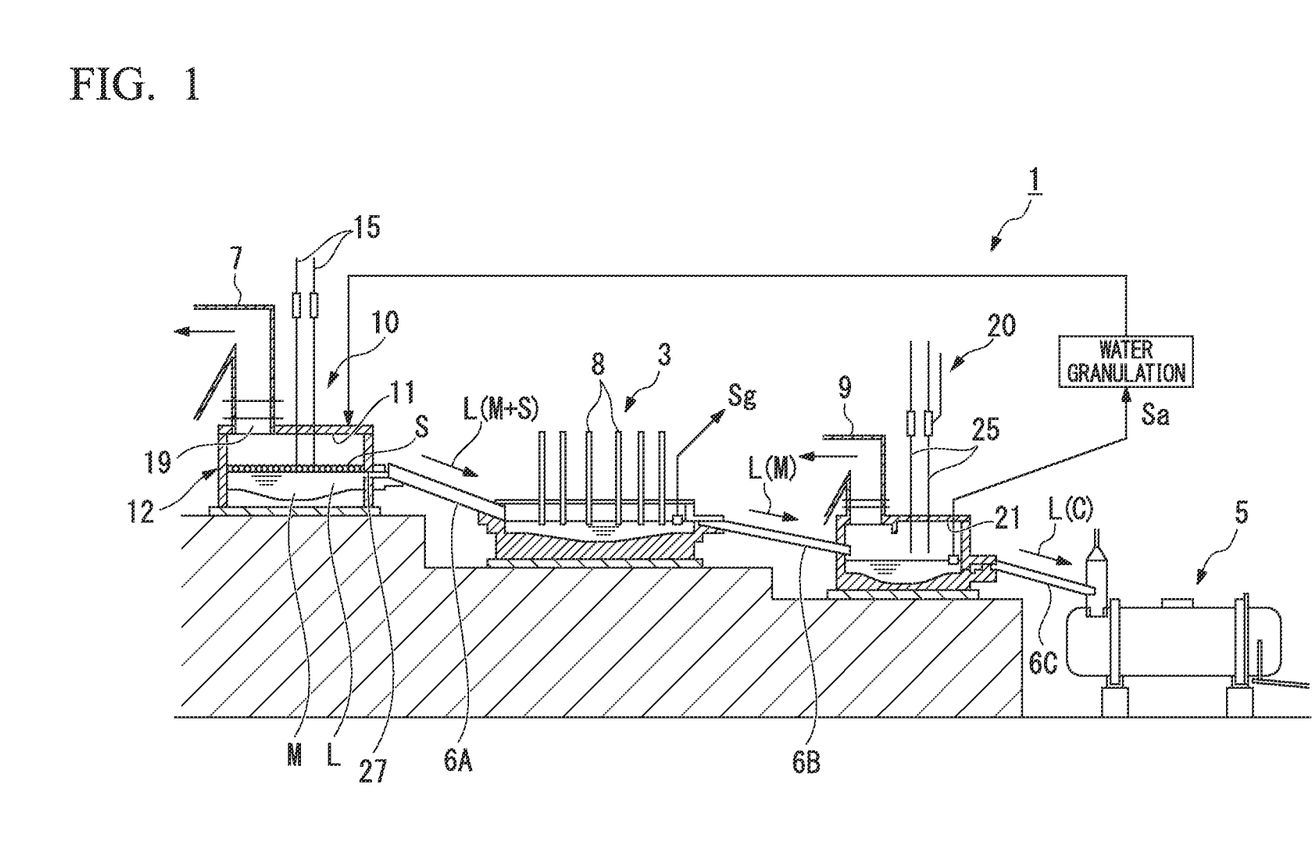
FIG. 1 is a view illustrating a continuous copper-smelting installation including a smelting furnace employing a method for treating combustible material according to an embodiment of the present invention.

As shown in FIG. 1, the continuous copper-smelting installation 1 has the smelting furnace 10 for heating and melting copper ores (copper concentrates) to produce molten substance L including matte M and slag S, a separating furnace 3 for separating the matte M and the slag S produced in the smelting furnace 10 from each other, a copper-producing furnace 20 for further oxidizing the matte M separated in the separating furnace 3 to produce blister copper C and slag S, and a refining furnace 5 for refining the blister copper C produced in the copper-producing furnace 20 to produce copper of higher quality and valuable metals.

The smelting furnace 10, the separating furnace 3, the copper-producing furnace 20, and the refining furnace 5 are connected to one another with launders 6A, 6B, and 6C, and are arranged with a difference in level among the furnaces in order of the smelting furnace, the separating furnace, the copper-producing furnace, and the refining furnace so that the molten substance L moves to the smelting furnace 10, the separating furnace 3, the copper-producing furnace 20, and the refining furnace 5 in this order by the action of gravity.

The smelting furnace 10 includes a furnace body 12 for smelting nonferrous metals and plural lance pipes (pipes) 15 for supplying mineral ores containing nonferrous metals (copper ores in the embodiment) to the molten substance L stored in the furnace body 12 with oxygen-enriched air (oxygen gas) and a flux.

The lance pipes 15 are provided so as to penetrate a ceiling wall 11 of the furnace body 12 in the vertical direction and provided so as to be liftable relative to a molten substance surface of the molten substance L.

Specifically, the lance pipes 15 are arranged above the molten substance surface of the molten substance L and are opened to the molten substance surface of the molten substance L. The lance pipes 15 are provided such that copper ores and oxygen-enriched air can be blown onto the molten substance surface of the molten substance L. In addition, an opening 19 for discharging gas (flue gas) generated in the furnace is provided on the ceiling wall 11 of the smelting furnace 10. A waste heat boiler 7 is connected to the downstream side of the opening 19.

The separating furnace 3 is provided for separating the matte M and the slag S in the molten substance L fed from the smelting furnace 10 using the specific gravity difference between the matte and the slag and a layer of the slag S having small specific gravity is formed on a layer of the matte M having large specific gravity.

In the separating furnace 3, plural electrodes 8 are arranged in a state in which lower ends of the electrodes are immersed in the slag. In the separating furnace 3, a three-phase AC current is input to the electrodes 8 from a transistor and generates Joule heat and thus the temperature of the molten substance L is maintained.

The copper-producing furnace 20 includes plural lance pipes 25 for supplying cold charge or limestone into the furnace with oxygen-enriched air such as an oxygen gas. The lance pipes 25 are provided so as to penetrate a ceiling wall 21 of the copper-producing furnace 20 in the vertical direction and provided so as to be liftable. In addition, a discharge port for discharging gas generated in the furnace is provided on the ceiling wall 21 of the copper-producing furnace 20. The discharge port is connected to a waste heat boiler 9.

In order to smelt copper in the continuous copper-smelting installation 1, dried copper concentrates (nonferrous metal materials) and a flux (silica sand, lime, or the like) are blown into the molten substance L of the smelting furnace 10 with oxygen-enriched air through the lance pipes 15.

In the smelting furnace 10, the melting and oxidation reaction of the copper concentrates proceeds and matte M composed of a mixture whose main components are copper sulfide and iron sulfide and slag S composed of gangue minerals in the copper concentrates, a flux, and iron oxides are produced in the molten substance L.

The matte M and the slag S included in the molten substance L of the smelting furnace 10 are sent to the separating furnace 3 through the launder 6A and are separated into a lower matte M layer and an upper slag S layer.

The slag S that is separated in the separating furnace 3 (Sg) is recovered separately from the matte M. Further, a sulfide-containing gas such as an $SO_2$ gas generated in the smelting furnace 10 or the like is transported to a sulfuric acid plant (not shown) and recovered as sulfuric acid or gypsum ($CaSO_4$).

On the other hand, the matte M separated in the separating furnace 3 is sent to the copper-producing furnace 20 through the launder 6B. In the copper-producing furnace 20, the air and a flux are further blown into the matte M using the lance pipes 25. Thus, sulfur and iron in the matte M can be oxidized and blister copper C having a purity of 98.5% or more can be obtained.

The blister copper C continuously produced in the copper-producing furnace 20 is transported to the refining furnace 5 through the launder 6C. Then, the blister copper C is refined in the refining furnace 5 and copper of higher quality is produced and is formed into an anode plate for electrolytic smelting by a casting machine (not shown).

In the above-described process, a part of copper is also oxidized and incorporated in slag Sa in the oxidation process in the copper-producing furnace 20. That is, iron oxide is contained in the slag Sa in the copper-producing furnace with copper oxide (10% to 30%). Therefore, in the typical process, the slag Sa in the copper-producing furnace is crushed into a solid powder by water granulation, dried, and then fed back to the smelting furnace 10, and re-melted with raw material mineral ores to facilitate the recovery of copper.

In such a continuous copper-smelting installation 1, waste such as waste electronic components or waste electronic substrates (combustible scrap, referred to as combustible material below) composed of combustible plastics containing valuable metals (such as Cu, Au, Ag, Pt, and Pd) other than copper concentrates are charged into the smelting furnace 10 and the combustible material is smelted with the copper concentrates. Thus, the valuable metals other than copper are also recovered with copper.

Specifically, while the furnace body 12 of the smelting furnace 10 is used for copper smelting, the molten substance L which is sent from the furnace body 12 to the copper-producing furnace 20 for the post-process is treated and the above-described valuable metals are recovered in a state in which the valuable metals are contained in the blister copper C.

In addition, although not particularly shown, a copper plate used as an anode plate in electrolytic smelting, so-called anode scrap, is fed to the copper-producing furnace 20. Since the anode scrap has high quality copper, the anode scrap is fed to the copper-producing furnace 20 positioned on the downstream side of the continuous copper-smelting installation 1 and thus the copper content is recovered without undergoing a complicated process.

Next, the smelting furnace 10 employing the method for treating combustible material according to the embodiment will be described in detail with reference to FIGS. 2 to 4.

The smelting furnace 10 includes the furnace body 12 having a bottomed cylindrical shape. The furnace body 12 is provided with the ceiling wall 11 so that the upper portion thereof is closed with the ceiling wall. The molten substance L is stored in the furnace body 12. The plural lance pipes 15 are arranged on the ceiling wall 11 so as to penetrate the ceiling wall 11. In the example of the drawing, the plural lance pipes 15 are linearly arranged in rows so that each row is parallel to each other (refer to the top view of the furnace body 12 show in FIG. 3).

The lance pipes 15 feed powdery copper ores (smelting raw materials) and an auxiliary material such as a flux (solvent) into the furnace body 12 with oxygen-enriched air at a high speed so that the oxidation reaction of the molten substance L is caused while the materials are collided with the molten substance surface of the molten substance L. The lance pipes 15 are provided above the molten substance surface of the molten substance L and opened to the molten substance surface. The lower end openings of the lance pipes 15 are arranged close to the molten substance surface of the molten substance L.

In the smelting furnace 10 in the embodiment, the lance pipes 15 can further blow the combustible material containing the valuable metals onto the molten substance surface of the molten substance L. The combustible material blown from the lance pipes 15 into the molten substance L is, for example, waste electronic components or waste electronic substrates which is crushed into powder or particles by a crusher in advance. By using such a fine combustible material, the combustible material is prevented from being clogged in the pipe toward the molten substance L.

In the embodiment, the average particle diameter (outer diameter) of the combustible material is, for example, 10 mm or less. In addition, coal such as coke or powdered coal (fossil fuel) can be further blown from the lance pipes 15.

Figure 4:
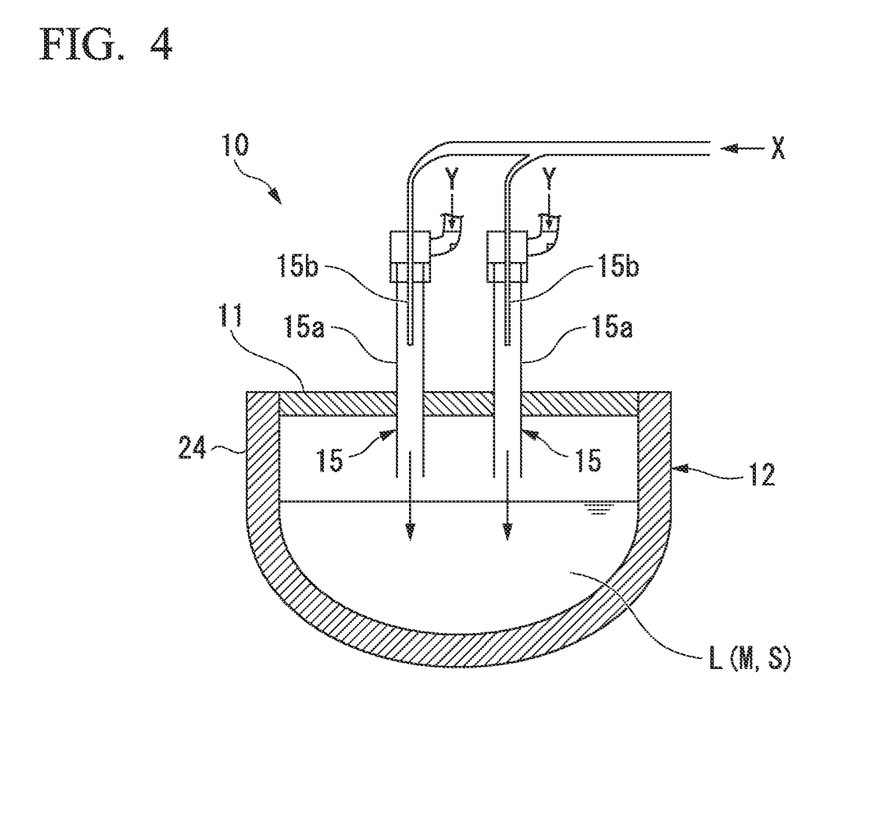
FIG. 4 is a view illustrating a structure of a lance pipe (pipe).

In the example shown in FIG. 4, the lance pipe 15 has a double cylinder structure. An outer cylinder 15a of the lance pipe extends to the molten substance surface of the molten substance L while penetrating the ceiling wall 11 of the furnace body 12. A lower end opening of an inner cylinder 15b of the lance pipe 15 is positioned inside the outer cylinder 15a. A region from the lower end opening of the inner cylinder 15b in the outer cylinder 15a to the lower end opening of the outer cylinder 15a is a mixing region in which each material (copper ores, auxiliary material, combustible material, oxygen-enriched air, coal, and the like) sent from the lance pipe 15 is mixed.

Among these materials, materials other than the oxygen-enriched air are preferably mixed in advance before the materials are introduced into the lance pipes 15. However, the combustible material and the coal are not limited thereto and the amount of the charged materials may be adjusted according to the temperature of the molten substance L or the gas temperature of the waste heat boiler 7.

In the embodiment, a material Y such as oxygen-enriched air is supplied to the molten substance L in the furnace body 12 through a space between the outer cylinder 15a and the inner cylinder 15b of the lance pipe 15. In addition, materials X such as the above-described copper ores, auxiliary material, combustible material, and coal, other than the oxygen-enriched air, are supplied to the molten substance L through the inner cylinder 15b of the lance pipe 15.

Specifically, when the various materials X are transported into the inner cylinder 15b of the lance pipe 15, these materials X are sent to the outer cylinder 15a from the lower end opening of the inner cylinder 15b in a state in which these materials are mixed in the inner cylinder 15b in advance. That is, in the embodiment, the inner cylinder 15b of the lance pipe 15 is a transport pipe capable of mixing the above-described materials X (specifically, materials X including at least one of the combustible material, copper ores, auxiliary material, and coal) other than the oxygen-enriched air.

In the method for treating combustible material according to the embodiment, at least the combustible material and the oxygen-enriched air are blown onto the molten substance surface of the molten substance L from the lance pipes 15 (blown vigorously at a high speed). In addition, the amount of coal charged into the molten substance L is adjusted according to the heat quantity contributed to the molten substance L from the combustible material charged into the molten substance L.

Specifically, when the heat quantity contributed to the molten substance L from the combustible material charged into the molten substance L is increased (or was increased), the amount of coal charged into the molten substance L is decreased according to the increase. When the heat quantity contributed to the molten substance L from the combustible material is decreased (or was decreased), the amount of coal charged into the molten substance L is increased according to the decrease. Accordingly, the temperature of the molten substance L is stably maintained. That is, when the amounts of the charged combustible material and coal are adjusted such that the temperature of the molten substance L is maintained within a predetermined range, the heat balance of the molten substance L is controlled.

Here, the amount of the combustible material charged into the molten substance L from each lance pipe 15 may be set uniformly relative to all the lance pipes 15. Alternatively, at least one or more pipes of the lance pipes 15 may be used as lance pipes 15 for the exclusive use of the combustible material for charging the combustible material. Further, the amount of the charged oxygen-enriched air blown from the lance pipes 15 may be set variously in the same manner as in the setting of the amount of the charged combustible material.

Furthermore, the amount of at least one of the charged combustible material and the oxygen-enriched air blown into the molten substance L from the lance pipes 15 may be controlled according to the temperature of the molten substance L or the gas temperature of the waste heat boiler 7.

Figure 2:
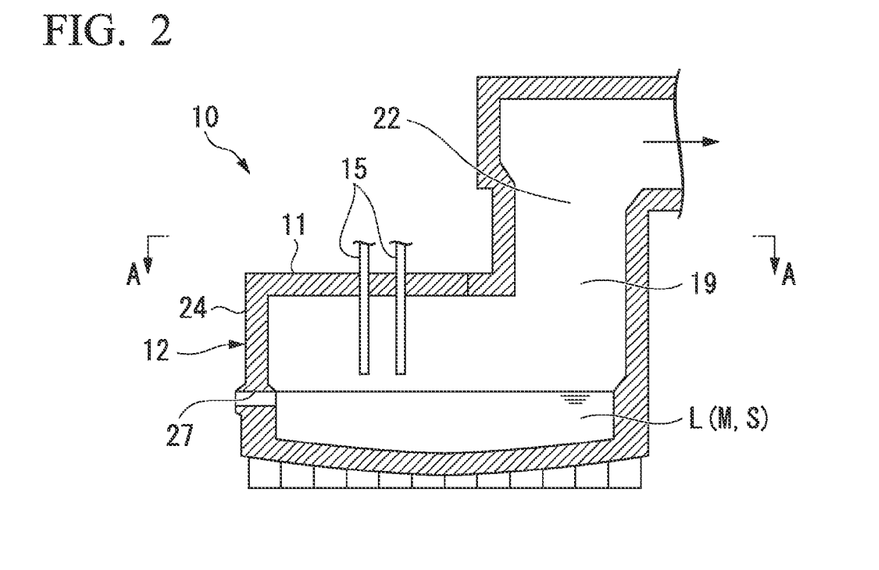
FIG. 2 is a side cross-sectional view of the smelting furnace.
Figure 3:
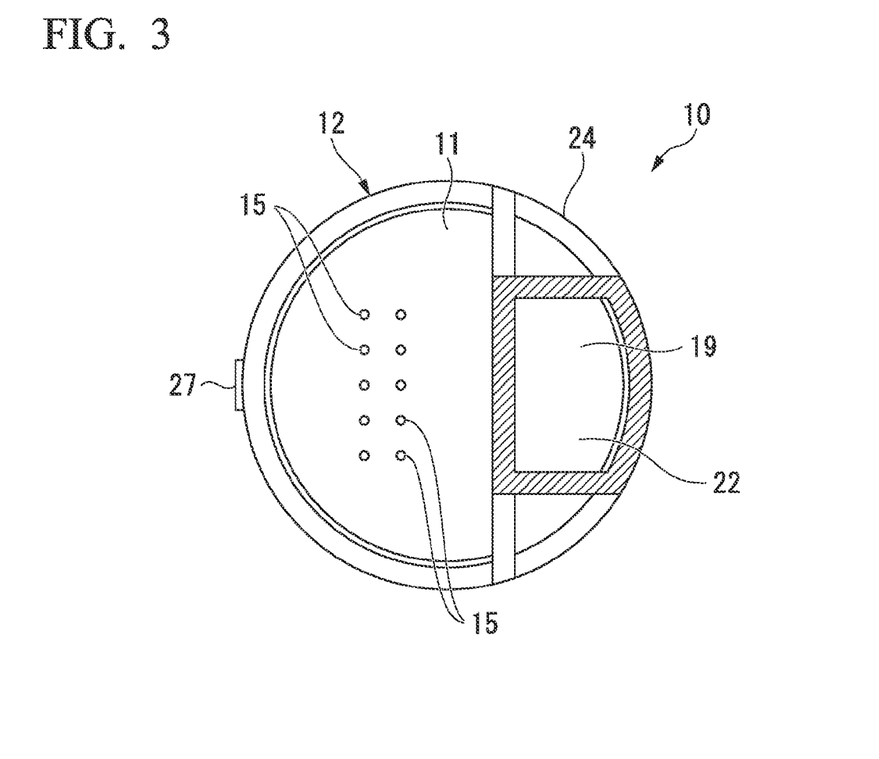
FIG. 3 is a view showing a cross-section taken along line A-A of FIG. 2.

As shown in FIGS. 2 and 3, an opening 19 having a rectangular cross-section is provided on the ceiling wall 11 of the furnace body 12 at a different position from the position of a group of the lance pipes 15. In the furnace body 12, a rising flue 22 for discharging a flue gas is provided so as to extend to the upper side of the opening 19.

A molten substance discharge port (overflow port) 27 is provided on a side wall 24 of the furnace body 12 at a position opposite to the opening 19 while being interposed between lance pipes 15. In FIG. 2, the molten substance discharge port 27 is positioned slightly lower than the lower end opening of the lance pipe 15. The molten substance L overflows from the molten substance discharge port 27 and is sent to the separating furnace 3 from the launder 6A.

According to the method for treating combustible material employed in the smelting furnace 10 of the continuous copper-smelting installation 1 according to the above-described embodiment, the smelting furnace 10, and the continuous copper-smelting installation 1, the combustible material and the oxygen-enriched air (for example, air having an oxygen content of about 40% to 70%) are blown onto the molten substance surface of the molten substance L stored in the furnace body 12 from the lance pipes 15 above the molten substance surface, and thus, the combustible material easily deeply enters the molten substance L and a large contact region with the molten substance L is ensured.

Since the combustible material is quickly heated, burned and melted, and also does not easily remain unmelted, the treatment efficiency of the combustible material is improved and the treatment capacity can be increased.

In addition, since the combustible material is blown into the molten substance L with the oxygen-enriched air, the combustible components contained in the combustible material easily react with the oxygen in the molten substance L and the combustible material is more easily burned and melted. Further, since the combustible material and the oxygen-enriched air are blown into the molten substance L, the action in which the combustible material is mixed with the molten substance L is obtained and also the above-described effects can be more remarkably obtained.

According to the embodiment, unlike the related art, the combustible material remaining unmelted is prevented from being discharged together with the slag S outside the system while containing the valuable metal components, and thus, the slag loss of the valuable metals is reduced.

In the continuous copper-smelting installation 1 of the embodiment, the launder 6A connecting the smelting furnace 10 and the separating furnace 3 on the downstream side thereof is provided and the molten substance L (matte M and slag S) discharged (overflowing) from the furnace body 12 of the smelting furnace 10 flows into the separating furnace 3 through the launder 6A. According to the embodiment, since the combustible material remaining unmelted is prevented from flowing in the launder 6A with the molten substance L, the launder 6A is prevented from being blocked and thus the molten substance L can be prevented from overflowing from the launder 6A.

In addition, since the combustible material in the molten substance L is blown and burned, the combustion heat of the combustible material is effectively used for heating the molten substance L. Accordingly, the amount of coal (fossil fuel such as coke or powdered coal) charged into the molten substance L as a fuel for heat compensation can be decreased and thus the running cost can be reduced.

Further, according to the embodiment, the combustible material is prevented from remaining and burning on the molten substance surface of the molten substance L. Thus, for example, a defect that bricks provided on the inner wall of the gas zone of the furnace body 12 (above the molten substance surface on the side wall 24 or on the inner wall of the ceiling wall 11) are damaged or the waste heat boiler 7 is overheated due to the combustion heat of the combustible material burning on the molten substance surface as in the related art is prevented.

Since the combustible material and the oxygen-enriched air are blown from the lance pipes 15 opened to the molten substance surface of the molten substance L, the combustible material does not easily float in the gas zone of the furnace body 12. Therefore, a material that is finely crushed into powder or particles as in the embodiment can be used as the combustible material.

That is, in the related art, when the combustible material in the form of powder or particles is allowed to simply fall onto the molten substance surface of the molten substance L, the combustible material is easily discharged with the flue gas and thus there is a concern of damaging the waste heat boiler 7 or the like. In contrast, in the embodiment, the combustible material is blown onto the molten substance surface and easily enters inside of the molten substance L. Thus, even when the combustible material in the form of powder or particles is used, the above-described defect is prevented.

When a material in the form of powder or particles is used as the combustible material, the combustible material is more quickly burned and melted in the molten substance L and also does not easily remain unmelted, and thus, the above-described effects are particularly remarkably obtained. However, the embodiment is not limited thereto and for example, when a large inner diameter of the lance pipe 15 can be ensured, the combustible material may be formed into a block, a lump, or a plate.

As described above, according to the embodiment, the combustible material can be brought into sufficient contact with the molten substance L and the combustion heat of the combustible material can be effectively used for heating the molten substance L. In addition, the slag loss of the valuable metals is suppressed by reducing the combustible material remaining unmelted and the treatment capacity of the combustible material can be increased. Further, the running cost can be reduced and thus the inner wall of the gas zone of the furnace body 12 or the waste heat boiler 7 can be prevented from being damaged.

In the embodiment, as a pipe for blowing the combustible material and the oxygen-enriched air onto the molten substance L, the lance pipes 15 for blowing mineral ores and oxygen-enriched air onto the molten substance surface of the molten substance L are used.

Accordingly, the present invention can be implemented using existing lance pipes provided in a smelting furnace of the related art for charging mineral ores (concentrates) into the molten substance L. Thus, the furnace body 12 can have a simple structure (that is, the structure can be maintained without being complicated) and thus the installation cost can be reduced.

Further, in the embodiment, the amount of coal charged into the molten substance L is adjusted according to the heat quantity contributed to the molten substance L from the combustible material charged into the molten substance L. Therefore, the amount of the used coal is reliably decreased and the running cost can be reduced. Also, the temperature of the molten substance L is stably maintained at a predetermined range and the treatment in the molten substance L becomes stable.

That is, when the heat quantity contributed to the molten substance L from the combustible material charged into the molten substance L is increased (or was increased), the amount of coal charged into the molten substance L is decreased according to the increase. When the heat quantity contributed to the molten substance L from the combustible material is decreased (or was decreased), the amount of coal charged into the molten substance L is increased according to the decrease. Accordingly, the temperature of the molten substance L can be stably maintained. As described in the above embodiment, since a sufficient heat quantity contributed to the molten substance L from the combustible material is easily ensured, the amount of coal charged into the molten substance L and the running cost can be reduced.

Specifically, in the method of the related art, the combustible material is only allowed to fall on the molten substance surface of the molten substance L. Therefore, the combustible material is not effectively used for heating the molten substance L such that the temperature of the molten substance L can be stably maintained or increased. Accordingly, even when the amount of the charged combustible material is simply increased, it is not easy to increase the heat quantity contributed to the molten substance L from the combustible material and it is difficult to decrease the amount of the charged coal. Further, in the method of the related art, when the amount of the combustible material charged into the molten substance L is simply increased, there is a concern that the inner wall of the gas zone of the above-described furnace body 12 or the waste heat boiler 7 may be damaged.

In the embodiment, the furnace body 12 is used in the smelting furnace 10 in the continuous copper-smelting installation 1 and the valuable metals in the combustible material can be effectively recovered in the copper-producing furnace 20 with the blister copper C in the post-process of the smelting furnace 10.

In the embodiment, the mixing region in which the combustible material and the oxygen-enriched air are mixed is provided in the lance pipes 15 of the smelting furnace 10. Accordingly, the combustible material and the oxygen-enriched air blown onto the molten substance surface of the molten substance L are ejected through the lance pipes 15 in a state in which the combustible material and the oxygen-enriched air are mixed in the lance pipes 15. Therefore, the combustible material blown into the molten substance L is more easily burned and melted and thus the above-described effects are remarkably obtained.

In addition, the materials X (materials X including at least any one of the combustible material, copper ores, auxiliary material, and coal), other than the oxygen-enriched air, transported to the molten substance L in the inner cylinder 15b of the lance pipe 15, are sufficiently mixed in the inner cylinder 15b before being blown onto the molten substance surface of the molten substance L. Therefore, these materials X are easily, rapidly and stably treated in the molten substance L.

The present invention is not limited to the above-described embodiment and various modifications can be made within a range not departing from the spirit of the present invention.

For example, in the above-described embodiment, as a pipe for blowing the combustible material and the oxygen-enriched air onto the molten substance surface of the molten substance L, the lance pipe 15 for blowing the mineral ores and the oxygen-enriched air onto the molten substance surface of the molten substance L is used. However, there is no limitation thereto.

That is, instead of using the lance pipe 15, an exclusive pipe for blowing combustible material and oxygen-enriched air may be provided. In this case, the above-described pipe is provided so as to be opened to the molten substance surface above the molten substance surface of the molten substance L stored in the furnace body 12. In addition, when such an exclusive pipe is provided, the inner diameter, the length, or the position of the lower end opening (a distance to the molten substance surface) of the pipe may be set variously according to the properties (such as shape and size) of the combustible blown into the material molten substance L.

Further, the exclusive pipe for blowing combustible material and oxygen-enriched air may be provided together with the lance pipes 15. That is, as mineral ores and oxygen-enriched air are blown onto the molten substance surface of the molten substance L from the lance pipes 15, combustible material and oxygen-enriched air may be blown onto the molten substance surface of the molten substance L from the exclusive pipe.

In the above-described embodiment, in the top view of the furnace body 12 shown in FIG. 3, the plural lance pipes 15 are linearly arranged in rows and the plural rows are arranged. However, the arrangement and the number of lance pipe 15 are not limited to this case.

That is, for example, in the top view of the lance pipe 15, the lance pipes 15 may be arranged in a circular shape (single circular shape or multiple concentric circle shape), a polygonal shape (single polygonal shape or multiple concentric polygonal shape), a matrix shape (lattice shape), or a dot shape (regular arrangement or irregular arrangement).

In addition, although the lance pipe 15 described in the above-described embodiment has a double cylinder structure, the structure is not limited thereto. The structure may be a single cylinder structure or triple or more cylinder structure other than the above structure.

Further, a mixing region may not be provided in the lance pipe 15. In this case, for example, the lower end opening of the outer cylinder 15a and the lower end opening of the inner cylinder 15b of the lance pipe 15 may be positioned at the same position (the same position in the vertical direction).

In the above-described embodiment, an example in which the present invention is applied to the smelting furnace 10 of the continuous copper-smelting installation 1 is described. However, the present invention is not limited thereto and the present invention can be applied to smelting furnaces other than the above-described smelting furnace and refining smelting.

In addition, the continuous copper-smelting installation 1 may include at least the smelting furnace 10, the separating furnace 3, and the copper-producing furnace 20 and the refining furnace 5 other than the above-described furnaces may be appropriately replaced with other treatment devices or omitted.

Additionally, each configuration (components) described in the above-described embodiments, modification examples, provisions, and the like may be combined within a range not departing from the spirit of the present invention and addition, omission, replacement and other modifications of the configuration can be made. In addition, the present invention is not limited to the above-described embodiments and is limited only by the claims.

EXAMPLES

Hereinafter, examples of the present invention will be described in detail. However, the present invention is not limited to the examples.

Example

First, as Example of the present invention, an operation of pulverizing combustible scrap (combustible material, referred to as simply scrap below) containing valuable metals and blowing the pulverized scarp onto a molten substance surface of molten substance L in an S furnace (smelting furnace 10) of a Mitsubishi continuous copper-smelting process from lance pipes 15 with oxygen-enriched air was performed.

The scrap is mainly composed of substrate scrap and includes a combustible resin material which is the main component, Cu, $SiO_2$, CaO, $Al_2O_3$, and a trace amount of Au and Ag. In addition, the scrap was crushed by a crusher so as to have a particle size of 10 mm or less.

The crushed scrap and copper ores were mixed and dried using a rotary drier, and then charged into the furnace from ten lance pipes 15 provided on the ceiling wall 11 of the S furnace. Regarding the amount of the charged copper ores and scrap, the amount of the copper ores was 101 tons (hereinafter, "ton" is simply written as "t") and the amount of the scrap was 6.4 t.

Further, powdered coal was added to the molten substance in an amount of about 300 kg/hr to maintain the temperature of the molten substance L for the purpose of compensating an insufficient heat source of the molten substance L until a test in which a mixture of the scrap and the copper ores was charged into the molten substance L from the lance pipes 15 started. Then, the addition of the powdered coal was stopped after the test started.

Figure 5:
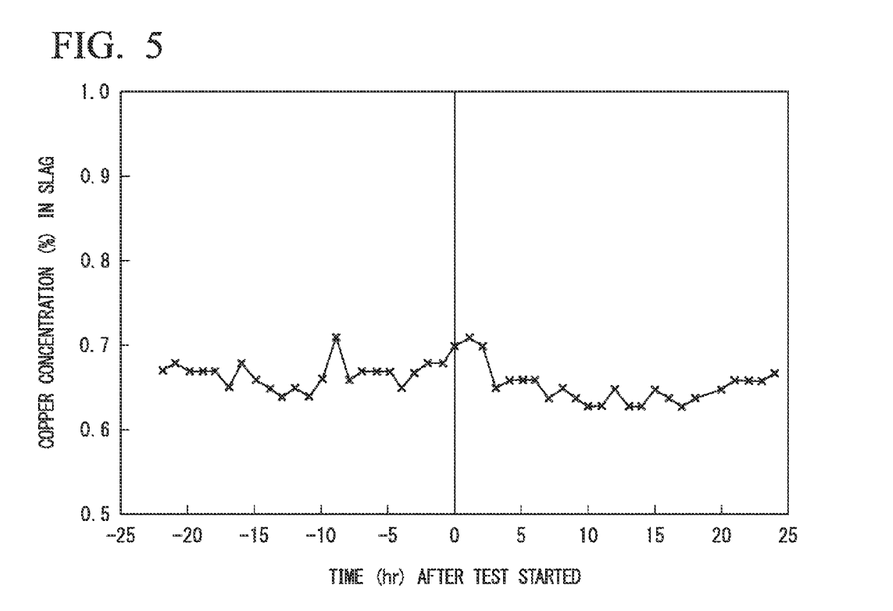
FIG. 5 is a graph illustrating a test result of Example of the present invention.

The molten substance L in the S furnace flowed out from the molten substance discharge port 27 of the furnace body 12 and was sent to the CL furnace (separating furnace 3) through the launder 6A. Then, the molten substance L was separated into matte M having copper sulfide and iron sulfide as main components and slag Sg having an oxide as a main component in the CL furnace. Valuable metals contained in the slag Sg were not recovered to be the slag loss of valuable metals. Further, the concentration of the valuable metals in the slag Sg is changed according to the treatment in the S furnace. For the purpose of confirming the treatment state in the S furnace, the concentration (%) of copper in the slag Sg was measured immediately after and before the test started. The concentration of copper in the slag was measured using an X-ray fluorescence analyzer. The result is shown in FIG. 5.

In addition, for the purpose of confirming the treatment state in the S furnace, the temperature (° C.) of the molten substance L and the gas temperature (° C.) of the waste heat boiler 7 were measured immediately after and before the test started.

Specifically, for example, in a case in which the scrap is not burned sufficiently in the molten substance L, or in a case in which the scrap is burned in the gas zone of the furnace body 12, a problem that the temperature of the molten substance L is decreased or the gas temperature of the waste heat boiler 7 is increased is predicted. The temperature was measured using a K-type thermocouple and N-type thermocouple. The result is shown in FIG. 6.

[Evaluation]

As seen from the test result shown in FIG. 5, the concentration (%) of copper in the slag after the test started (right region of 0 (hr) on the horizontal axis of the graph shown in FIG. 5) was almost the same as or equal to or lower than the concentration (%) of copper in the slag before the test started (left region of 0 (hr) on the horizontal axis of the graph shown in FIG. 5). As described above, there was no adverse influence by the charging of the scrap from the lance pipes 15 in the example.

Figure 6:
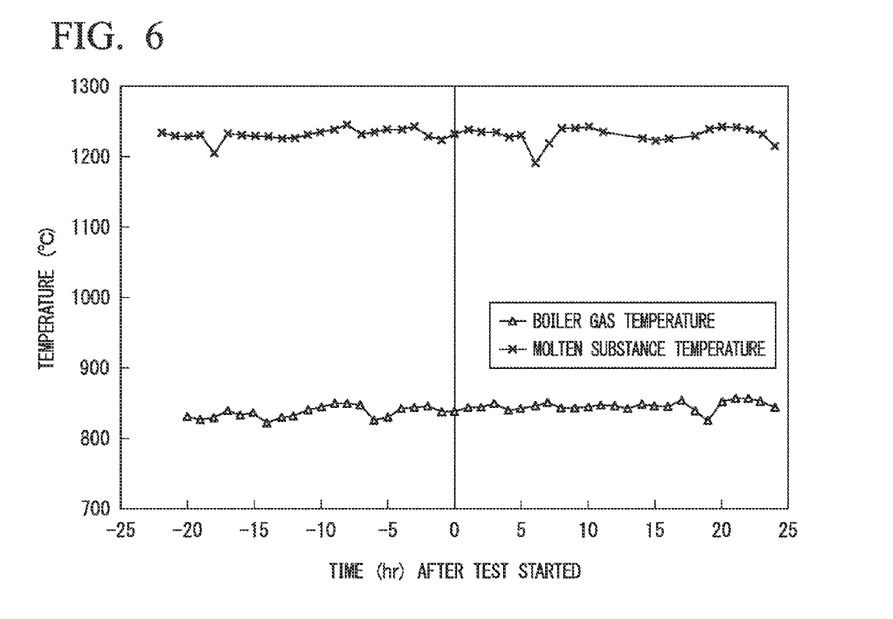
FIG. 6 is a graph illustrating a test result of Example of the present invention.

As seen from the test result shown in FIG. 6, the temperature (° C.) of the molten substance L after the test started (right region of 0 (hr) on the horizontal axis of the graph shown in FIG. 6) was almost the same as the temperature (° C.) of the molten substance L before the test started (left region of 0 (hr) on the horizontal axis of the graph shown in FIG. 6). That is, the heat quantity of the powdered coal was able to be compensated by the blowing of the scrap into the molten substance L in the example.

In addition, the gas temperature (° C.) of the waste heat boiler 7 after the test started was almost the same as the gas temperature (° C.) of the waste heat boiler 7 before the test started. Thus, in the example, it was confirmed that even when the crushed scrap was used, the scrap deeply entered the molten substance L and was treated satisfactory.

Comparative Example

Next, as Comparative example, an operation of allowing scrap (combustible material) containing valuable metals to fall onto a molten substance surface of molten substance from a charging port to be charged into an S furnace (smelting furnace) in which the charging port (feeding port) was formed on the ceiling wall of the furnace body was performed.

In Comparative example, regarding the amount of the mineral ores and scrap charged into the molten substance, the amount of the mineral ores was 99 t, and the amount of the scrap was 0.9 t before the test started and was 2.0 t after the test started.

The amount of the powdered coal added to the molten substance was not changed before and after the test started. Under the same conditions as the above-described example except that the amount was not changed, the concentration (%) of copper in the slag Sg, the temperature (° C.) of the molten substance, and the gas temperature (° C.) of the waste heat boiler were measured. The results are shown in FIGS. 7 and 8.

[Evaluation]

Figure 7:
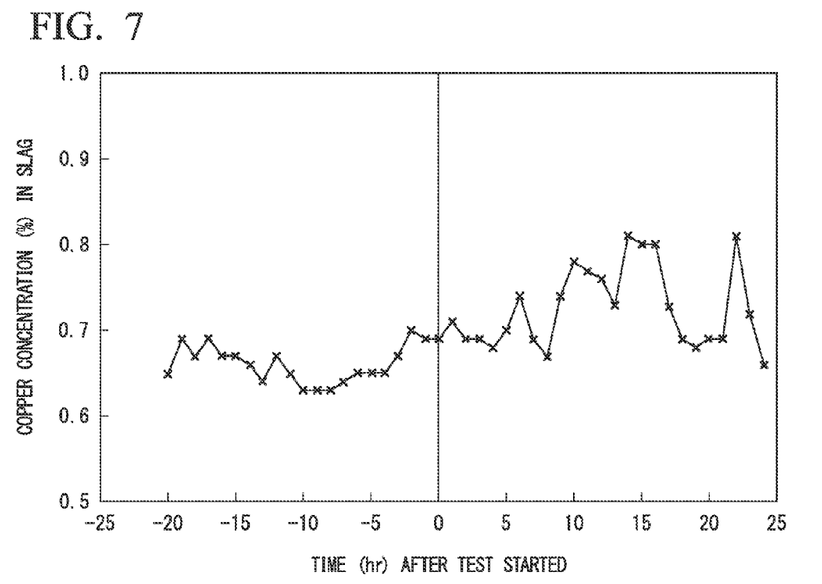
FIG. 7 is a graph illustrating a test result of Comparative example of the related art.

As seen from the test result shown in FIG. 7, the concentration (%) of copper in the slag after the test started (right region of 0 (hr) on the horizontal axis of the graph shown in FIG. 7) was clearly increased compared to the concentration (%) of copper in the slag before the test started (left region of 0 (hr) on the horizontal axis of the graph shown in FIG. 7), and the value thereof was unstable. This is because the amount of the valuable metals to be shifted to the slag Sg is increased accompanying the unmelted scrap.

Figure 8:
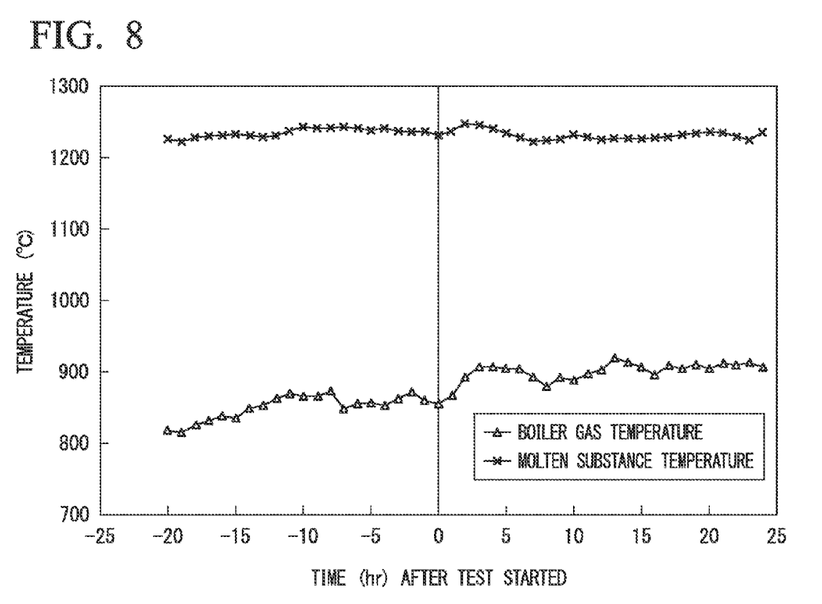
FIG. 8 is a graph illustrating a test result of Comparative example of the related art.

In addition, as seen from the test result shown in FIG. 8, while the temperature of the molten substance in the S furnace was not substantially changed after and before the test started, the gas temperature inside the waste heat boiler was remarkably increased after the test started (right region of 0 (hr) on the horizontal axis of the graph shown in FIG. 8). This is because a part of the scrap charged into the S furnace is burned in the gas zone of the furnace body or the waste heat boiler. As seen from the result, in Comparative example, even when the amount of the charged scrap was increased, the heat quantity contributed to the molten substance was not increased so much, and thus, the amount of the added powdered coal was not able to be reduced. Further, in the test of Comparative example, a problem, such as abnormal dust adhesion to the water pipe of the waste heat boiler, caused by an increase in the gas temperature inside the waste heat boiler was confirmed.

INDUSTRIAL APPLICABILITY

According to the present invention, the combustible material can be brought into sufficient contact with the molten substance and the combustion heat of the combustible material can be effectively used for heating the molten substance. The slag loss of the valuable metals is suppressed by reducing the combustible material remaining unmelted and thus the treat capacity of the combustible material can be increased. The ruffling cost can be reduced and the inner wall of the gas zone of the furnace body and the waste heat boiler can be prevented from being damaged. Therefore, the present invention is industrially applicable.

REFERENCE SIGNS LIST

1: CONTINUOUS COPPER-SMELTING INSTALLATION
3: SEPARATING FURNACE
6A, 6B, 6C: LAUNDER
10: SMELTING FURNACE

12: FURNACE BODY
15: LANCE PIPE (PIPE)
20: COPPER-PRODUCING FURNACE
C: BLISTER COPPER
L: MOLTEN SUBSTANCE
M: MATTE
S (SA, SG): SLAG
X: MATERIAL (COMBUSTIBLE MATERIAL)
Y: MATERIAL (OXYGEN-ENRICHED AIR)

The invention claimed is:

1. A method for treating combustible material, comprising:
   providing a pipe which is opened to a molten substance surface above the molten substance surface of molten substance stored in a furnace body for smelting nonferrous metals, wherein the pipe is a double cylinder structure containing a mixing region from the end opening of the inner cylinder in the outer cylinder to the end opening of the outer cylinder;
   blowing combustible material containing valuable metals and oxygen-enriched air onto the molten substance surface from the pipe thereby immersing the combustible material in the molten substance, and burning and melting the combustible material while stirring the combustible material in the molten substance; and
   treating the molten substance in a post-process, and recovering the valuable metals with the smelting nonferrous metals, wherein
   supplying the oxygen-enriched air through a space between the inner cylinder and the outer cylinder,
   the pipe and an opening for discharging flue gas generated in the furnace body are provided on a ceiling wall of the furnace body,
   the opening is provided on the ceiling wall at a different position from the position of the pipe, and is connected to a waste heat boiler,
   a molten substance discharge port for discharging the molten substance from the furnace body is provided on a side wall of the furnace body, and
   the molten substance discharge port is provided on the side wall at a position opposite from the opening interposed therebetween the pipe.

2. The method for treating combustible material according to claim 1,
   wherein a lance pipe for blowing mineral ores containing nonferrous metals and oxygen-enriched air onto the molten substance surface is used as the pipe.

3. The method for treating combustible material according to claim 2,
   wherein an amount of coal charged into the molten substance is adjusted according to heat quantity contributed to the molten substance from the combustible material charged into the molten substance.

4. The method for treating combustible material according to claim 2, using a continuous copper-smelting installation including a smelting furnace, a separating furnace and a copper-producing furnace, which are connected to one another with launders, the method further comprising:
   heating and melting copper ores to produce molten substance including matte and slag in the smelting furnace;
   separating the matte and the slag produced in the smelting furnace from each other in the separating furnace;
   oxidizing the matte separated in the separating furnace to produce blister copper and slag in the copper-producing furnace; and
   blowing the combustible material and the oxygen-enriched air onto the molten substance surface from the pipe in the smelting furnace.

5. The method for treating combustible material according to claim 4,
   wherein an amount of coal charged into the molten substance is adjusted according to heat quantity contributed to the molten substance from the combustible material charged into the molten substance.

6. The method for treating combustible material according to claim 4,
   wherein the furnace body is used for copper smelting, and the molten substance is treated in a post-process to recover the valuable metals in a state in which the valuable metals are contained in blister copper.

7. The method for treating combustible material according to claim 2,
   wherein the furnace body is used for copper smelting, and the molten substance is treated in a post-process to recover the valuable metals in a state in which the valuable metals are contained in blister copper.

8. The method for treating combustible material according to claim 1, using a continuous copper-smelting installation including a smelting furnace, a separating furnace and a copper-producing furnace, which are connected to one another with launders, the method further comprising:
   heating and melting copper ores to produce molten substance including matte and slag in the smelting furnace;
   separating the matte and the slag produced in the smelting furnace from each other in the separating furnace;
   oxidizing the matte separated in the separating furnace to produce blister copper and slag in the copper-producing furnace; and
   blowing the combustible material and the oxygen-enriched air onto the molten substance surface from the pipe in the smelting furnace.

9. The method for treating combustible material according to claim 8,
   wherein an amount of coal charged into the molten substance is adjusted according to heat quantity contributed to the molten substance from the combustible material charged into the molten substance.

10. The method for treating combustible material according to claim 8,
    wherein the furnace body is used for copper smelting, and the molten substance is treated in a post-process to recover the valuable metals in a state in which the valuable metals are contained in blister copper.

11. The method for treating combustible material according to claim 1,
    wherein an amount of coal charged into the molten substance is adjusted according to heat quantity contributed to the molten substance from the combustible material charged into the molten substance.

12. The method for treating combustible material according to claim 11,
    wherein the furnace body is used for copper smelting, and the molten substance is treated in a post-process to recover the valuable metals in a state in which the valuable metals are contained in blister copper.

13. The method for treating combustible material according to claim 1,
    wherein the furnace body is used for copper smelting, and the molten substance is treated in a post-process to recover the valuable metals in a state in which the valuable metals are contained in blister copper.

14. A smelting furnace used for implementation of the method for treating combustible material according to claim 1,
- wherein a pipe which is opened to a molten substance surface is provided above the molten substance surface of molten substance stored in a furnace body and the lower end opening of the pipe are arranged close to the molten substance surface,
- combustible material containing valuable metals and oxygen-enriched air are able to be blown onto the molten substance surface through the pipe, wherein
- the oxygen-enriched air is supplied through a space between the outer cylinder and the inner cylinder,
- the pipe and an opening for discharging flue gas generated in the furnace body are provided on a ceiling wall of the furnace body,
- the opening is provided on the ceiling wall at a different position from the position of the pipe, and is connected to a waste heat boiler,
- a molten substance discharge port for discharging the molten substance from the furnace body is provided on a side wall of the furnace body, and
- the molten substance discharge port is provided on the side wall at a position opposite from the opening interposed therebetween the pipe.

15. A continuous copper-smelting installation comprising:
- a smelting furnace for heating and melting copper ores to produce molten substance including matte and slag;
- a separating furnace for separating the matte and the slag produced in the smelting furnace from each other;
- a copper-producing furnace for oxidizing the matte separated in the separating furnace to produce blister copper and slag; and
- launders for connecting the smelting furnace, the separating furnace, and the copper-producing furnace to one another,
- wherein the smelting furnace according to claim 14 is used as the smelting furnace.

16. The smelting furnace according to claim 14,
- wherein the pipe is a lance pipe capable of blowing mineral ores containing nonferrous metals and oxygen-enriched air onto the molten substance surface.

17. The smelting furnace according to claim 16,
- wherein a mixing region in which the combustible material and the oxygen-enriched air are mixed is provided in the pipe.

18. A continuous copper-smelting installation comprising:
- a smelting furnace for heating and melting copper ores to produce molten substance including matte and slag;
- a separating furnace for separating the matte and the slag produced in the smelting furnace from each other;
- a copper-producing furnace for oxidizing the matte separated in the separating furnace to produce blister copper and slag; and
- launders for connecting the smelting furnace, the separating furnace, and the copper-producing furnace to one another,
- wherein the smelting furnace according to claim 16 is used as the smelting furnace.

19. The smelting furnace according to claim 14,
- wherein a mixing region in which the combustible material and the oxygen-enriched air are mixed is provided in the pipe.

20. A continuous copper-smelting installation comprising:
- a smelting furnace for heating and melting copper ores to produce molten substance including matte and slag;
- a separating furnace for separating the matte and the slag produced in the smelting furnace from each other;
- a copper-producing furnace for oxidizing the matte separated in the separating furnace to produce blister copper and slag; and
- launders for connecting the smelting furnace, the separating furnace, and the copper-producing furnace to one another,
- wherein the smelting furnace according to claim 19 is used as the smelting furnace.

* * * * *